(12) United States Patent
Schubert et al.

(10) Patent No.: US 8,309,673 B2
(45) Date of Patent: Nov. 13, 2012

(54) POLYETHER SILOXANE-CONTAINING ALKOXYLATION PRODUCTS BY DIRECT ALKOXYLATION OF ORGANOMODIFIED α,ω-DIHYDROXYSILOXANES OVER DOUBLE METAL CYANIDE (DMC) CATALYSTS, AND ALSO PROCESS FOR PRODUCING THEM

(75) Inventors: Frank Schubert, Neukirchen (DE); Wilfried Knott, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 65 days.

(21) Appl. No.: 12/492,586

(22) Filed: Jun. 26, 2009

(65) Prior Publication Data

US 2010/0168367 A1    Jul. 1, 2010

(30) Foreign Application Priority Data

Jun. 27, 2008    (DE) .................... 10 2008 002 713

(51) Int. Cl.
*C08G 77/46* (2006.01)
*C08G 77/445* (2006.01)

(52) U.S. Cl. ............................. 528/27; 528/26

(58) Field of Classification Search ........................ None
See application file for complete search history.

(56) References Cited

U.S. PATENT DOCUMENTS

| | | | |
|---|---|---|---|
| 3,480,583 A * | 11/1969 | O'Connor et al. | ............. 556/446 |
| 5,391,679 A | 2/1995 | Burkhart et al. | |
| 5,430,166 A | 7/1995 | Klein et al. | |
| 5,455,367 A | 10/1995 | Klein et al. | |
| 5,475,127 A | 12/1995 | Klein et al. | |
| 5,719,249 A | 2/1998 | Fujita et al. | |
| 5,856,369 A * | 1/1999 | Jorgenson et al. | ............. 521/112 |
| 5,880,245 A | 3/1999 | Fujita et al. | |
| 5,981,812 A | 11/1999 | Eufinger et al. | |
| 6,291,622 B1 | 9/2001 | Drose et al. | |
| 6,307,082 B1 | 10/2001 | Klein et al. | |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 2004/0132951 A1 | 7/2004 | Burkhart et al. | |
| 2006/0155089 A1 | 7/2006 | Ferenz et al. | |
| 2006/0241270 A1 | 10/2006 | Burkhart et al. | |
| 2007/0043193 A1 | 2/2007 | Henning et al. | |
| 2007/0049717 A1 | 3/2007 | Knott et al. | |
| 2007/0128143 A1 | 6/2007 | Gruning et al. | |
| 2008/0153934 A1 | 6/2008 | Neumann et al. | |
| 2008/0153992 A1 | 6/2008 | Knott et al. | |
| 2008/0153995 A1 | 6/2008 | Knott et al. | |
| 2008/0171829 A1 * | 7/2008 | Haider et al. | ................. 524/588 |
| 2009/0030097 A1 | 1/2009 | Knott et al. | |
| 2009/0137751 A1 | 5/2009 | Knott et al. | |
| 2009/0137752 A1 | 5/2009 | Knott et al. | |
| 2010/0041910 A1 | 2/2010 | Schubert et al. | |
| 2010/0056649 A1 | 3/2010 | Henning et al. | |
| 2010/0081781 A1 | 4/2010 | Schubert et al. | |

FOREIGN PATENT DOCUMENTS

EP    0 573 864    12/1993

OTHER PUBLICATIONS

Abstract for the article entitled "Application of Reactive Siloxane Prepolymers for the Synthesis of Thermoplastic Poly(ester-siloxane)s and Poly(ester-ether-siloxanes)" authored by Antic et al. and published in the Journal of the Serbian Chemical Society (2007), 72 (2), 139-150.*

* cited by examiner

*Primary Examiner* — Marc Zimmer

(74) *Attorney, Agent, or Firm* — Frommer Lawrence & Haug LLP

(57) ABSTRACT

Novel silicone polyethers by alkoxylating polymerization of epoxide monomers with (poly)organosiloxanes starting from an α,ω-dihydroxysiloxane as starter by means of DMC catalysis and process for preparing them.

10 Claims, No Drawings

POLYETHER SILOXANE-CONTAINING ALKOXYLATION PRODUCTS BY DIRECT ALKOXYLATION OF ORGANOMODIFIED α,ω-DIHYDROXYSILOXANES OVER DOUBLE METAL CYANIDE (DMC) CATALYSTS, AND ALSO PROCESS FOR PRODUCING THEM

This application claims benefit under 35 U.S.C. 119(a) of German patent application DE 10 2008 002 713.8, filed on 27 Jun. 2008.

Any foregoing applications, including German patent application DE 10 2008 002 713.8, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to novel polyether siloxane-containing alkoxylation products by direct alkoxylation of organomodified α,ω-dihydroxysiloxanes over DMC catalysts, and also a process for preparing them.

According to the present-day state of the art, a plurality of process variants are used for preparing the economically important class of SiOC-bonded polyether siloxanes, also referred to as silicone polyethers or siloxane-polyether copolymers.

Classically, SiOC bonds are formed by reaction of a siloxane with a leaving group (e.g. halogen) bound to the silicon atom and an alcohol or polyetherol. The latter is usually obtained beforehand by alkoxylation of monohydroxy-functional starter compounds, for example butanol, by means of alkylene oxides. Chlorosiloxanes in particular are widespread as starting compounds for this type of reaction. However, chlorosiloxanes are difficult to handle since they are extremely reactive. Their use is also associated with the disadvantage that the hydrogen chloride formed during the reaction restricts handling to corrosion-resistant plants and leads to ecological problems. In addition, organic chlorine compounds can be formed in the presence of chlorosiloxanes and alcohols or polyetherols and these are undesirable for toxicological reasons. Furthermore, it is not easy to achieve quantitative conversion in the reaction of a chlorosiloxane with an alcohol or polyetherol, so that the OH-functional component often has to be used in a stoichiometric excess based on the SiCl functions of the siloxane component. The use of an excess of polyether in practice means that relatively large amounts of unreacted excess polyethers are unavoidably present in the silicone polyethers prepared in this way and these unreacted polyethers reduce the concentration of the surface-active silicone polyethers and adversely affect the use properties of the target products. Bases frequently have to be added as HCl scavengers in the chlorosiloxane route in order to achieve good conversions. The use of these bases results in formation of large quantities of salts whose removal presents difficulties on an industrial scale.

As an alternative to this process, it is possible to react alcohols or polyetherols with hydrogensiloxanes in which hydrogen is bound directly to silicon. Under suitable conditions, only hydrogen is eliminated in forming the SiOC bond here. This dehydrogenative condensation proceeds only in the presence of a catalyst. U.S. Pat. No. 5,147,965 refers to a process which is described in the Japanese patent publication JP 480-19941 and in which a hydrogensiloxane is reacted with an alcohol with addition of alkali metal hydroxides or alkali metal alkoxides. A disadvantage of this process is that the catalysts have to be neutralized after the reaction is complete and although the salt burden formed here is lower than that in the chlorosiloxane process, the salts nevertheless have to be filtered off, representing an undesirable complication. EP-A-0 475 440 (U.S. Pat. No. 5,147,965) describes a process in which hydrogensiloxanes are reacted with an alcohol with addition of an organic acid in the presence of a Pt salt. For this reaction, it is absolutely necessary that both large amounts of organic acid (from 0.1 to 1 mol based on alcohol), toluene as solvent and a platinum salt are used. Since both toluene and acid are undesirable in the end product, these once again have to be separated off after the reaction is complete. In addition, platinum salts are not only expensive but are also not unproblematical from a physiological point of view. In the cosmetics industry in particular, there is a desire for products which are free of platinum.

The process described in J. Boyer, R. J. P. Corriu, R. Perz, C. Reye, J. Organomet. Chem. 1978, 157, 153-162, makes do without use of heavy metals. Here, salts such as potassium tartrate, phthalate or formate are used as heterogeneous catalysts. However, the reactions require the use of equimolar amounts of the salts based on the SiH units and proceed successfully only at high temperatures of about 180° C. Both the drastic conditions and the large amounts of salts required make this process unattractive for the industrial scale.

In the patent applications DE 103 12 636 (US Patent Appl. Pub. 2004-186260) and DE 103 59 764 (US Patent Appl. Pub. 2005-136269), boron-containing catalysts are used for the dehydrogenative condensation of hydrogensiloxanes and alcohols. However, the procedure described has the disadvantage that the catalysts are comparatively expensive and the products obtained therewith can sometimes not be prepared economically.

All the abovementioned processes for preparing SiOC-based polyether siloxanes are two-stage processes. The OH-functional polyethers required for the reaction with chlorosiloxanes or hydrogensiloxanes have to be prepared in a separate, preceding alkoxylation step. Conventional polyether alcohols, which are often referred to simply as polyethers or polyetherols for short and are made up predominantly of propylene oxide and ethylene oxide, have been known for a long time and are produced industrially in large quantities. Most processes for preparing them make use of basic catalysts such as alkali metal hydroxides and alkali metal methoxides.

The use of KOH is particularly widespread and has been known for many years. Typically, a usually low molecular weight hydroxy-functional starter such as butanol is reacted in the presence of the alkaline catalyst with an alkylene oxide such as ethylene oxide, propylene oxide, butylene oxide or a mixture of various alkylene oxides to form a polyoxyalkylene polyether having a terminal OH group. The strongly alkaline reaction conditions in this living polymerization promote various secondary reactions. The rearrangement of propylene oxide into allyl alcohol, which in turn functions as chain initiator, and chain termination reactions lead to polyethers having a relatively broad molar mass distribution and unsaturated by-products.

The disadvantages of base-catalysed alkoxylation doubtlessly also include the necessity of freeing the resulting reaction products of the active base by means of a neutralization step. It then becomes absolutely necessary to separate off the water formed in the neutralization by distillation and to separate off the salt formed by filtration.

Apart from the base-catalysed reaction, acid catalyses are also known for alkoxylation. Thus, DE 102004007561 describes the use of $HBF_4$ and of Lewis acids such as $BF_3$, $AlCl_3$ and $SnCl_4$ in alkoxylation technology.

A disadvantage of the acid-catalysed polyether synthesis has been found to be the unsatisfactory regioselectivity in the ring opening of unsymmetrical oxiranes, e.g. propylene oxide, which leads, in a manner which is not easy to control, to polyoxyalkylene chains having some secondary and some primary OH ends. As in the case of the base-catalysed alkoxylation reaction, a work-up sequence of neutralization, distillation and filtration is also absolutely necessary here. If ethylene oxide is introduced as monomer into the acid-catalysed polyether synthesis, the formation of dioxane as undesirable by-product has to be expected.

A single-stage process for preparing specific polyether siloxanes is described in U.S. Pat. No. 5,175,327. Polydimethyl-silanediols are alkoxylated directly with addition of ethylene oxide (EO) and/or propylene oxide (PO) onto the SiOH groups in the presence of conventional alkaline or acidic catalysts such as sodium hydroxide, potassium hydroxide, sodium methoxide or phosphoric acid.

In this process, polyether siloxanes of the formula (IX)

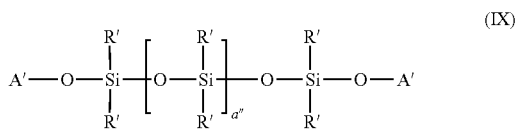

where A' is $—(CH_2—CH_2—O)_h—(CH_2—CH(CH_3)O)_i—(CH_2—CH_2—O)_j—H$ and h, i and j can, independently of one another, be from 0 to 200 and the sum of h+i+j is greater than 0 and a" is an integer of from 1 to 2000 and R' is a methyl group, are prepared (in admixture with starting materials and other components, as described below).

In one embodiment of the invention, the polyether siloxane (IX) is a compound that excludes those polymers where each of the following conditions are simultaneously met:
R' is a methyl group;
A' is $—(CH_2—CH_2—O)_h—(CH_2—CH(CH_3)O)_i—(CH_2—CH_2—O)_j—H$;
h, i and j are, independently of one another, from 0 to 200;
the polyether units h, i and j are randomly distributed;
and a" is an integer from 0 to 4999.

In another embodiment, polyether siloxanes (IX) adhering to the conditions where
the sum h+i+j>0; and
a" is an integer from 1 to 2000;
are excluded.

A disadvantage of the process is its limited applicability. The siloxane component or the siloxanol and the resulting SiOC bond have only low hydrolytic stability under the basic or acidic alkoxylation conditions. The reaction of siloxanes having SiOH groups with alkylene oxides induced under basic conditions incurs the risk that, due to the unavoidable formation of silanolate groups, that not only the desired alkoxylation but also reorganization and equilibration reactions of the siloxane framework can take place. The use range of the process disclosed in U.S. Pat. No. 5,175,327 is generally restricted to polyether chains of the Si—O-(EO)—(PO)-(EO)—H type having a maximum of 200 EO or PO units. In addition, the arrangement of the (EO) and (PO) units is strictly blockwise since the monomers are added in succession and random incorporation into the molecular chain can therefore not occur (analogous to the information given in the "general reaction conditions" in column 4 of the patent text). Other, less reactive epoxide monomers such as butylene oxide, styrene oxide or even glycidyl compounds cannot be used in the alkoxylation described. The lability of the siloxane framework and the SiOC bond of the polyether siloxanes prepared as described in U.S. Pat. No. 5,175,327 makes it necessary to leave the alkaline or acidic catalyst used in the end product since neutralization and thus deactivation of the catalyst in aqueous medium with subsequent distillation and filtration of salts, as is customary in the case of the conventional basic or acidic catalysis of, for example, alcohols or phenols, would lead to unacceptable siloxane rearrangements and hydrolysis reactions. Accordingly, the products which can be prepared by the process of U.S. Pat. No. 5,175,327 still contain active catalyst and are consequently either basic or acidic. The reactions described in U.S. Pat. No. 5,175,327 can in any case not lead to the end products described there as pure substances but at best provide the compounds in admixture with other substances or as intermediates.

In general, acid- or base-labile systems can be alkoxylated only with difficulty, if at all. This applies particularly to organosilicic acid derivatives such as siloxanols which display a pronounced tendency to undergo acid- or base-induced hydrolysis and rearrangement of the siloxane framework. This also applies to the α,ω-dihydroxysiloxanes used here according to the invention.

SiOC-bonded silicone polyethers are, owing to their surface-active properties, a class of product which has a variety of uses. Depending on the composition, they are employed, for example, as polyurethane foam stabilizers, antifoams, wetting agents or dispersing additives.

Up to the present day, there is no synthetic process which allows SiOC-based silicone polyethers to be prepared in a simple manner in only one simple process step.

It is therefore an object of the present invention to overcome the indicated deficiencies of the prior art and provide a single-stage direct alkoxylation process starting from α,ω-dihydroxysiloxanes and epoxy-functional monomers and also novel linear SiOC-bonded silicone polyether structures having terminal hydroxyl groups which are based on this process principle.

It has now surprisingly been found that organosiloxanes bearing SiOH groups, i.e. organomodified silicic acid derivatives, which are known for their tendency to undergo condensation and their lability in base and acid can be alkoxylated directly in an advantageous and simple manner using known double metal cyanide catalysts, also referred to as DMC catalysts.

Alkoxylations by means of DMC catalysis have hitherto been carried out exclusively on carbon-bonded hydroxyl groups, i.e. on chain starters such as alcohols, phenols and carboxylic acids. Owing to their hydrolysis sensitivity, siloxanols have hitherto been able to be subjected to alkoxylation reactions to only a very limited extent since, particularly in basic and acidic medium, i.e. especially in the presence of the catalysts such as alkali metal hydroxides and acids used according to the prior art for the alkoxylation reaction with alkylene oxides such as ethylene oxide or propylene oxide, rearrangements of the siloxane fragments, condensation reactions and homopolymerizations occur.

The process claimed according to the invention opens up, for the first time and in a simple manner, the possibility of the DMC-catalysed alkoxylating polymerization of monomers bearing epoxide groups, e.g. alkylene oxides, starting from an SiOH-functional starter bearing a reactive hydrogen atom to form linear, terminally OH-functional silicone polyethers.

The process claimed according to the invention ensures the synthetic flexibility to incorporate not only alkylene oxides but also further epoxide-functional monomers such as glycidyl compounds and, if required, further types of monomers terminally, in isolated positions, cumulated in blocks and/or randomly distributed into the polymer chain of a silicone polyether. Unlike the products obtainable via the chlorosiloxane and hydrogensiloxane route, the products which can be prepared by the process of the invention contain terminal hydroxyl groups.

Furthermore, the process of the invention makes it possible to obtain novel, likewise inventive alkoxylation products which contain polyether siloxanes and whose structural variety in respect of the structure of the polyether chains is not restricted by the abovementioned limitations known from U.S. Pat. No. 5,175,327 in the polyether chain and in which propylene oxide can also be used as starting monomer.

The organomodified α,ω-dihydroxysiloxanes which can be used for the purposes of the invention are usually obtained by controlled hydrolysis of chlorosilanes and are available on an industrial scale. SiOH-functional siloxane compounds obtained in this way are, thanks to their reactive hydroxyl groups bound to the Si atom, valuable synthetic building blocks and intermediates for various subsequent reactions. SiOH-terminated polydimethylsiloxanols which can, for example, form relatively high molecular weight polydimethylsiloxane structures with elimination of water are particularly widespread.

The double metal cyanide catalysts (DMC catalysts) used for the process claimed according to the invention have in terms of their preparation and use as alkoxylation catalysts been known since the 1960s and are described, for example, in U.S. Pat. No. 3,427,256, U.S. Pat. No. 3,427,334, U.S. Pat. No. 3,427,335, U.S. Pat. No. 3,278,457, U.S. Pat. No. 3,278,458 or U.S. Pat. No. 3,278,459. The evermore effective types of DMC catalysts which have been developed further in subsequent years and are described, for example, in U.S. Pat. No. 5,470,813 and U.S. Pat. No. 5,482,908 include, in particular, zinc-cobalt hexacyano complexes. Thanks to their extraordinarily high activity, only low concentrations of the catalysts are required for preparing polyetherols, so that the work-up stage required for conventional alkaline catalysts, comprising neutralization and precipitation and removal by filtration of the catalyst, at the end of the alkoxylation process can be dispensed with. The high selectivity of the DMC-catalysed alkoxylation is attributable to the fact that, for example, polyethers based on propylene oxide contain only very small proportions of unsaturated by-products.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The present process according to the invention makes it possible for the first time to obtain the abovementioned advantages of DMC catalysis in the novel alkoxylation of SiOH-functional starter compounds. Suitable chain starters in the DMC-catalysed alkoxylation by the process of the invention are the organomodified α,ω-dihydroxysiloxanes of the general formula (I),

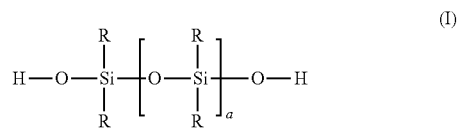

where
the radicals R are identical or different linear or branched, saturated, monounsaturated or polyunsaturated alkyl radicals having from 1 to 20, in particular from 1 to 10, carbon atoms,
and
a is an integer from 0 to 5000, preferably from 2 to 5000, particularly preferably from 2 to 4000 and in particular from 9 to 3000
R in formula (I) is preferably a methyl radical.

Mostly short-chain commercially available α,ω-dihydroxysiloxanes of the formula (I) can contain cyclic siloxane species such as octamethylcyclotetrasiloxane and decamethylcyclopentasiloxane formed by condensation as secondary constituents. These siloxane rings do not bear any reactive SiOH groups and are thus inert in the alkoxylation reaction according to the invention in the presence of DMC catalysts. Depending on requirements or the field of application of the desired alkoxylation products, any such cyclic siloxane compounds present can either remain in the system or be removed completely or partly, e.g. by means of a simple vacuum distillation. The removal of cyclic siloxane species by distillation can be carried out either before the alkoxylation or after the alkoxylation is complete.

Short-chain, in particular, α,ω-dihydroxysiloxanes of the formula (I) produced industrially can contain low concentrations of water as further typical condensation product. Should the water concentration attain extraordinarily high values of, for example, over 1% in the α,ω-dihydroxysiloxane, it can be advantageous to remove at least part of the water from the siloxanol starter by vacuum distillation before addition of the DMC catalyst and before commencement of the alkoxylation since it can have an inhibiting effect on the catalytic activity of the double metal cyanide.

In the α,ω-dihydroxysiloxanes having a>9 in the formula (I) which are particularly preferred for the purposes of the invention, both cyclic siloxane by-products and water are present in such small concentrations that no purification of the siloxanol by distillation or another method is required.

The prior art refers to various alkoxylation processes which employ catalysis by means of double metal cyanide catalysts. References which may be mentioned here are, for example, EP-A1-1017738 (U.S. Pat. No. 6,077,978), U.S. Pat. No. 5,777,177, EP-A1-0981407 (U.S. Pat. No. 5,844,070), WO-2006/002807 (US Patent Appl. Pub. 2007-225394) and EP-A-1474464 (US Patent Appl. Pub. 2005-159627).

It has surprisingly been found that it is not only possible to alkoxylate conventional starters having a carbon-bonded OH function, for example alcohols (e.g. butanol, allyl alcohol, octanol, dodecanol, dipropylene glycol, glycerol), phenols or carboxylic acids by means of alkylene oxides such as ethylene oxide, propylene oxide and 1,2-butylene oxide but it is also possible to use the group of SiOH-functional compounds which are characterized by the presence of at least one OH function located on an Si atom as chain starters for the alkoxylation, without the restrictions and disadvantages described in U.S. Pat. No. 5,175,327. As a result of the novel DMC-catalysed process of the invention, alkoxylation technology gains a great increase in flexibility in the construction of novel linear, OH-terminated polyether siloxane structures, and the process makes it possible to prepare a large group of SiOC-bonded siloxane-polyether copolymers in only a single simple process step.

The α,ω-dihydroxysiloxanes of the formula (I) which are known for their sensitivity to alkali and acid are, in the process of the invention, alkoxylated in the presence of DMC catalysts in a simple manner under mild, neither basic nor acidic conditions so that the siloxane framework determined by the respective siloxanol starter is retained in respect of chain length and linearity. The concentrations of DMC catalyst used in the synthesis are so low that the catalyst dissolves in the end product and therefore does not have to be removed from the alkoxylation product formed and does not have any appreciable adverse effect on the product properties. Salts are not formed as undesirable coproducts in the preparative process of the invention, and a work-up or purification step after conclusion of the alkoxylation reaction is not necessary either. The process of the invention makes it possible to retain the advantages of high reaction rate and omission of catalyst deactivation and removal which are known for double metal cyanide systems and to expand the use range of the DMC technology to the alkoxylation of organomodified silicic acid derivatives.

According to the invention, all compounds of the formula (I) can be used either alone or in mixtures with one another as starter compounds for the DMC-catalysed alkoxylation reaction. A combination of α,ω-dihydroxysiloxanes of the formula (I) with conventional starter compounds such as monofunctional and polyfunctional alcohols, polyetherols or phenols is also possible.

The objective is to provide a universal alkoxylation process which, as a result of the flexible use of alkylene oxides such as ethylene oxide, propylene oxide, butylene oxide and/or further alkylene oxides and also glycidyl compounds and further comonomers, allows a variety of novel polyether siloxane structures of the formula (VII) having a monomer order which can be varied within wide limits to be built up.

For the purposes of the present invention, starter compounds are substances which form the beginning (start) of the polyether molecule to be prepared. This starter structure is retained during the addition according to the invention of epoxide-functional monomers of the formulae (II) and (III) onto the molecule. The starter compound used in the process of the invention is preferably selected from the group consisting of α,ω-dihydroxysiloxanes of the formula (I). The starter compounds can be used either alone or in admixture with one another. A combination of α,ω-dihydroxysiloxanes of the formula (I) with conventional starter compounds such as monofunctional and polyfunctional alcohols, polyetherols or phenols is also possible. However, preference is given to using exclusively organomodified α,ω-dihydroxysiloxanes of the formula (I) at the start of the alkoxylation.

As SiOH-functional starter compounds (I), preference is given to using polydimethylsiloxanols having two terminal hydroxyl groups and average molar masses ($M_w$ based on GPC chromatography results) of from 100 to 400 000 g/mol, in particular from 200 to 300 000 g/mol, very particularly preferably from 700 to 250 000 g/mol.

In the DMC-catalysed alkoxylation to prepare silicone polyethers by the process of the invention, the α,ω-dihydroxysiloxanes of the formula (I) can be reacted with alkylene oxides of the general formula (II),

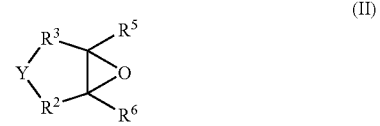

(II)

where $R^2$ or $R^3$ and $R^5$ or $R^6$ are identical or different and are each, independently of one another, H or a saturated or monounsaturated or polyunsaturated, monovalent or polyvalent hydrocarbon radical which may be further substituted, where the radicals $R^5$ or $R^6$ are each a monovalent hydrocarbon radical. The hydrocarbon radical can be cycloaliphatically bridged via the fragment Y; Y can be absent or be a methylene bridge having 1 or 2 methylene units; when Y is 0 then $R^2$ and $R^3$ are each, independently of one another, a linear or branched radical having from 1 to 20, preferably from 1 to 10, carbon atoms, particularly preferably a methyl, ethyl, propyl or butyl, vinyl, allyl or phenyl radical. Preference is given to at least one of the two radicals $R^2$ and $R^3$ in formula (II) being hydrogen. Particular preference is given to using ethylene oxide, propylene oxide, 1,2- or 2,3-butylene oxide, isobutylene oxide, 1,2-dodecene oxide, styrene oxide, cyclohexene oxide (here $R^2$-$R^3$ is a —CH$_2$CH$_2$CH$_2$CH$_2$— group, and Y is therefore —CH$_2$CH$_2$—) or vinylcyclohexene oxide or mixtures thereof as alkylene oxides. The hydrocarbon radicals $R^2$ and $R^3$ in the formula (II) may in turn be further substituted and bear functional groups such as halogens, hydroxyl groups or glycidyloxypropyl groups. Such alkylene oxides include epichlorohydrin and 2,3-epoxy-1-propanol. The monomers of the formula (II) can be added sequentially in any order or in admixture.

It is likewise possible to use glycidyl compounds such as glycidyl ethers and/or glycidyl esters of the general formula (III),

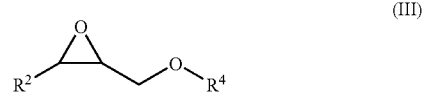

(III)

where at least one glycidyloxypropyl group is bound via an ether or ester function $R^4$ to a linear or branched alkyl radical having from 1 to 24 carbon atoms, an aromatic or cycloaliphatic radical, either individually, in admixture or in combination with the alkylene oxides depicted in formula (II). This class of compounds includes, for example, allyl, butyl, 2-ethylhexyl, cylohexyl, benzyl, $C_{12}/C_{14}$-fatty alcohol, phenyl, p-tert-butylphenyl and o-cresyl glycidyl ethers. Preferred glycidyl esters are, for example, glycidyl methacrylate, glycidyl acrylate and glycidyl neodecanoate. It is likewise possible to use polyfunctional epoxide compounds such as 1,2-ethyl, 1,4-butyl or 1,6-hexyl diglycidyl ether.

The epoxide compounds of the formulae (II) and (III) can be added in blocks or randomly as desired onto one or more chain starters of the formula (I) having at least one reactive SiOH group.

Apart from monomers bearing epoxide groups, it is also possible to use monomers other than epoxide monomers under the conditions of the DMC-catalysed alkoxylation. Such other monomers include lactones, saturated, unsaturated or aromatic cyclic dicarboxylic anhydrides and also carbon dioxide, either alone or in any mixtures with one another.

As lactones of the formula (IV),

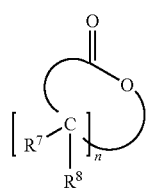
(IV)

it is possible to use, for example, compounds in which n is an integer from 2 to 8 and $R^7$ and $R^8$ are each, independently of one another, either hydrogen or an alkyl, alkoxy, aryl or aralkyl group and these can be copolymerized in a ring-opening polymerization to form polyether siloxanes containing ester groups. Suitable lactones which can be used in this way are, for example, ε-caprolactone, δ-valerolactone and γ-butyrolactone and also mixtures of various lactones. Preference is given to using ε-caprolactone as comonomer. During the alkoxylation process, the respective epoxide and lactone monomers can be copolymerized in any order and variable amounts either in succession or simultaneously in parallel to form polyether-ester copolymers having a blockwise or randomly distributed arrangement of the individual monomer building blocks.

As an alternative to or in addition to lactones, it is also possible to use saturated, unsaturated or aromatic cyclic dicarboxylic anhydrides of the formulae (V) and (VI),

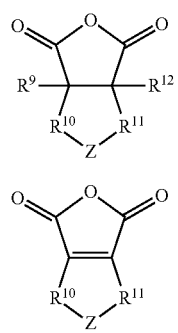

where $R^9$, $R^{10}$, $R^{11}$ and $R^{12}$ are each, independently of one another, either hydrogen or an alkyl, alkenyl, alkoxy, aryl or aralkyl group, as comonomers in addition to the monomers of the formulae (II) and (III) bearing epoxide groups under the conditions of the DMC-catalysed alkoxylation. The hydrocarbon radical can be cycloaliphatically or aromatically bridged via the fragment Z, where Z can be a divalent alkylene or alkenylene radical. Preferred cyclic anhydrides are succinic anhydride, oct(en)ylsuccinic, dec(en)ylsuccinic and dodec(en)ylsuccinic anhydrides, maleic anhydride, phthalic anhydride, hexahydrophthalic, tetrahydro-phthalic, dihydrophthalic, methylhexahydrophthalic and methyltetrahydrophthalic anhydrides. During the alkoxylation process, the respective anhydride monomers can be copolymerized in any order and in variable amounts in succession or simultaneously in parallel with the epoxide feed with ring opening to form siloxane-polyether-ester copolymers. Mixtures of anhydrides of the formulae (V) and (VI) can also be used.

If the alkoxylation according to the invention of α,ω-dihydroxysiloxanes is carried out in the presence of carbon dioxide, polyethers or polyether-esters modified by means of carbonate groups can be prepared by insertion of carbon dioxide into the polymer chain. Such reactions preferably take place in autoclave reactors under superatmospheric pressure and a carbon dioxide atmosphere. The carbonate content can be varied and can be controlled, for example, by selection of the temperature and pressure conditions during the reaction.

The process principle of the DMC-catalysed alkoxylation reaction comprises, in the first step, placing a starter mixture comprising at least one α,ω-dihydroxysiloxane starter and the double metal cyanide catalyst, which has, if appropriate, previously been slurried in a suspension medium, in the reactor. Only part of the total amount of epoxide monomer to be introduced is usually added to this initially charged mixture in order to activate the DMC catalyst. The end of this initialization phase is in the case of gaseous epoxides such as ethylene oxide or propylene oxide indicated by a rapid pressure drop in the autoclave. After catalyst activation has occurred, further epoxide monomer can be metered in. There is the option of, for example, adding on a plurality of monomers simultaneously or successively in blocks. It is also possible to add on further α,ω-dihydroxysiloxane or other OH-functional starters which can be identical to the initially charged starters or be chemically different therefrom during introduction of the monomers.

The process of the invention very flexibly allows various embodiments of the alkoxylation of α,ω-dihydroxysiloxanes by means of DMC catalysts.

Starters employed are α,ω-dihydroxysiloxanes of the formula (I) and these can be used either individually or as a mixture. At least one of the epoxide compounds of the formula (II) or (III) is added to the initially charged starter mixture of at least one siloxanediol and the DMC catalyst. To start the alkoxylation reaction and to activate the double metal cyanide catalyst, usually only part of the total amount of epoxide to be introduced is added at the beginning. Preference is given to using an alkylene oxide of the formula (II), particularly preferably propylene oxide or 1,2-butylene oxide, for this purpose. The molar ratio of epoxide to the reactive groups of the starter, in particular the SiOH groups in the starter mixture, in the start phase is preferably 0.1-100:1, preferably 0.2-60:1, in particular 0.4-50:1. After the start phase, i.e. after initialization of the reaction, further starter compound of the formula (I) and further epoxide or only further epoxide, if appropriate also further monomers of the formula (IV), (V) or (VI) and also carbon dioxide, are fed in either simultaneously or successively depending on the desired molar mass and molecular structure. In place of or in addition to the further addition of siloxanol during the monomer addition, it is also possible to introduce other OH-functional starter compounds such as alcohols, polyetherols or phenols and also the OH-terminated polyether siloxanes/silicone polyethers of the formula (VII) during the monomer addition in order to obtain complex mixtures of alkoxylation products. If exclusively α,ω-dihydroxysiloxanes of the type (I), possibly supplemented by an addition of previously prepared polyether siloxanes of the formula (VII), are used as starters, the preferred linear polyether siloxanes according to the invention are obtained. Regardless of the choice of starters, the different epoxides of the formulae (II) and (III) can be added on in any mixture with one another or in combination with lactones (IV) or cyclic anhydrides (V), (VI) or together with carbon dioxide. The reaction can, e.g. for the purpose of reducing the viscosity of the reaction mixture, be carried out in a solvent which is inert in the alkylation reaction. Suitable inert solvents are, for example, aliphatic or aromatic ethers, hydrocarbons, in particular toluene, xylene or cyclohexane.

As an alternative, a siloxanediol or a plurality of α,ω-dihydroxysiloxanes of the formula (I) can be initially charged together with the alkoxylation products which have previously been prepared by the process of the invention from α,ω-dihydroxysiloxanes and contain polyether siloxanes of the formula (VII) and be alkoxylated in admixture according to the abovementioned process principle of DMC catalysis.

It is also possible to use the alkoxylation products which have been obtained by alkoxylation of α,ω-dihydroxysiloxanes of the formula (I) and comprise polyether siloxanes of the formula (VII) as starters and to add one or more siloxanol compounds of the formula (I) in parallel to the addition of monomers only after initialization of the DMC catalyst has been carried out.

The alkoxylation by means of DMC catalysis can also be carried out starting from mixtures of the α,ω-dihydroxysiloxanes of the formula (I) with monofunctional or polyfunctional, saturated or unsaturated, linear or branched alcohols or else polyetherols which have themselves preferably been prepared by means of an alkoxylation reaction or phenols which may be substituted. Thus, mixtures of polyether siloxanes with polyetherols are obtained in one reaction step. In addition to the α,ω-dihydroxysiloxanes, the hydroxy-terminated polyether siloxanes according to the invention of the formula (II) can also be initially charged as starters.

When mixtures of different starters are used, the mixing ratio and the order of addition of these can be varied as desired. It is also possible to remove any substances which inhibit the reaction from the reaction mixture, e.g. by distillation or according to the teachings of WO-98/52689 (U.S. Pat. No. 5,844,070) by stripping, before addition of the epoxide to initialize the reaction. However, distillation and stripping are preferably omitted when the starter mixture contains low molecular weight and therefore low-boiling siloxanol components.

The commencement of the exothermic reaction can, for example, be detected by monitoring the pressure and/or temperature. A sudden drop in the pressure in the reactor in the case of gaseous alkylene oxides indicates that the alkylene oxide is being incorporated, the reaction has thus started and the end of the start phase has been reached. The duration of the start phase and the amount of epoxide monomer required for activating the DMC catalyst can vary depending on the type and amount of the siloxanol starter used or the composition of the starter mixture, since the commercially available α,ω-dihydroxysiloxanes sometimes contain varying concentrations of water which can delay commencement of the reaction. If the water content of the siloxanol starter is high, it can be advantageous to place only a small amount of the total siloxanol required together with DMC catalyst in the reactor at the beginning and, after addition of, for example, propylene oxide or 1,2-butylene oxide as starting monomer feed the further, remaining amount of siloxanol in continuously parallel to the monomer feed. The joint initial introduction of a mixture of siloxanol and a previously prepared polyether siloxane according to the invention also promotes rapid commencement of the alkoxylation reaction in the case of a relatively high water content. Partial removal of the water by distillation in some cases likewise promotes rapid commencement of the DMC-catalysed alkoxylation reaction.

As suspension medium for the DMC catalyst, it is possible to utilize, for example, inert solvents or advantageously one or more starter compounds of the formula (I) or polyether siloxanes of the formula (VII) or alternatively mixtures of the components mentioned.

In the preparation of the product according to the invention, the molar ratio of the sum of the epoxides introduced, including the epoxides added at the beginning in the start phase, based on the starter compound used, in particular based on the number of SiOH groups in the starter compound used, is preferably $1\text{-}10^4:1$, in particular $1\text{-}10^3:1$.

The addition reaction of the monomers preferably occurs at a temperature of from 60 to 250° C., particularly preferably at a temperature of from 90 to 160° C. The pressure at which the alkoxylation takes place is preferably from 0.02 bar to 100 bar absolute, particularly preferably from 0.05 to 20 bar absolute and in particular from 0.2 to 5 bar absolute. Carrying out the alkoxylation at subatmospheric pressure enables the reaction to be carried out very safely. If appropriate, the alkoxylation can be carried out in the presence of an inert gas (e.g. nitrogen).

In another embodiment of the invention, the reaction takes place at a pH of about 4.5 to about 8.5, preferably about 5.5 to about 7.5, more preferably about 7.0.

After addition of monomer and any after-reaction to complete the reaction of the monomer, any residual amounts of unreacted monomer and any further volatile constituents are removed, usually by vacuum distillation, gas stripping or other deodorization methods. Should the siloxanol starter used have introduced cyclic siloxane components into the system, these can, for example, be removed by simple distillation at this point in the process. The removal of volatile secondary components can be carried out either batchwise or continuously. In the process of the invention based on DMC catalysis, filtration can normally be dispensed with.

The process steps can be carried out at identical or different temperatures.

As DMC catalyst, it is possible to use all known DMC catalysts, preferably those comprising zinc and cobalt, preferably those comprising zinc hexacyanocobaltate(III). The DMC catalysts described in U.S. Pat. No. 5,158,922, US 20030119663, WO 01/80994 (US Patent Appl. Pub. 2003-158449) or in the abovementioned documents are preferably used. The catalysts can be amorphous or crystalline.

The catalyst concentration in the reaction mixture is preferably from >(greater than) 0 to 5000 wppm (ppm by mass), preferably from >0 to 1000 wppm, particularly preferably from 1 to 500 wppm. This concentration is based on the total mass of the alkoxylation products formed.

The catalyst is preferably introduced only once into the reactor. The amount of catalyst should be set so that a sufficient catalytic activity is ensured in the process. The catalyst can be introduced as solid or in the form of a catalyst suspension. If a suspension is used, the starter of the formula (I) or a polyether siloxane of the formula (VII) obtained by alkoxylation is particularly useful as suspension medium. However, suspending the catalyst is preferably dispensed with.

In another embodiment of the invention, there is no catalyst removal step and/or purification step to obtain or purify the compounds of the invention.

In another embodiment of the invention, the amount of salt coproducts formed prior to any catalyst removal step or purification step is less than 1000 ppm, preferably less than 100 ppm and more preferably less than 10 ppm.

The process of the invention can equally well be used to prepare linear, terminally OH-functional polyether siloxanes according to the invention of the formula (VII) which are characterized in that they can be prepared in a targeted and reproducible fashion in respect of structure and molar mass. In particular, the process of the invention makes it possible to obtain novel polyethersiloxane copolymers which in contrast to the products prepared conventionally by the chlorosiloxane or hydrogensiloxane route are linear and terminally OH functional.

The sequence of monomer units can be varied within wide limits. Epoxide monomers of the type (II) or (III) can be incorporated next to one another in any desired blocks or randomly into the alkylene oxide chain or polyether chain. The fragments inserted into the growing polymer chain by the ring-opening reaction of the reaction components of the formulae (II) and (III) can be freely permutated with one another in their sequence.

The invention further provides the novel silicone polyethers which can be obtained by the process of the invention and whose manifold structural variations are described by formula (VII),

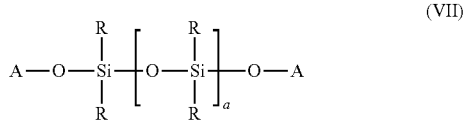
(VII)

where A corresponds to the polyether fragment of the formula (VIII)

3. the sum b+c+d+e+f+g>zero and
4. the indices c to g are different from zero when the index b is from 1 to 200 and at the same time the fragment having the index b is EO (ethylenoxy group) or PO (propylenoxy group) or
5. when the sum of the indices c to g is zero and the index b is from 1 to 200 and the fragments are EO or PO units, these are not present in a random sequence.

Preference is given to silicone polyethers in which when a is less than or equal to 101, the sum of c+d+e+f+g is not zero.

Preference is also given to silicone polyethers in which at least one of the indices b to g is not zero and which have an average molar mass ($M_w$ based on GPC chromatography results) of at least 8000 g/mol and in particular greater than 10 000 g/mol.

In another embodiment of the invention, the polydispersity ($M_w/M_N$) of the compounds of formula (I) shown is about 1.0 to about 5.0, preferably 1.0 to about 4.0, more preferably about 1.2 to about 3.5.

The indices in the formulae shown here and the value ranges of the indices indicated are therefore average values of the possible statistical distribution of the structures actually present and/or mixtures thereof. This also applies per se to precisely reproduced structural formulae, for example to formula (I), (VII) and (VIII).

Depending on the type of terminal epoxide monomer and the regioselectivity of the epoxide ring opening, primary, secondary or tertiary OH end groups are formed. As a result of their OH functionality, the products prepared according to the

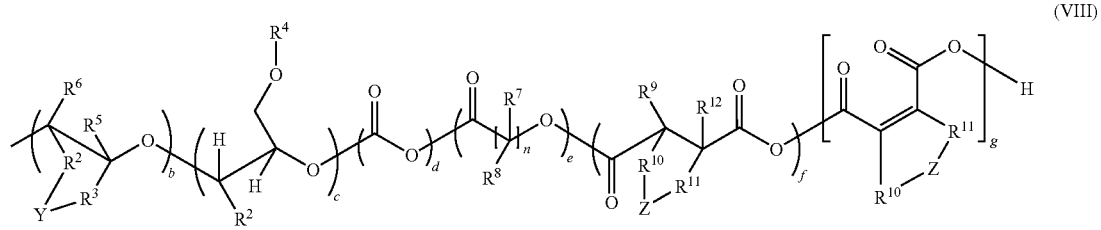
(VIII)

and the substituents R, $R^2$-$R^{12}$ and also the radicals Y and Z correspond to the definitions given above for the compounds of the formulae (I), (II), (III), (IV), (V) and (VI) and n is an integer from 2 to 8,
a is an integer from 0 to 5000, preferably from 50 to 5000, particularly preferably from 102 to 4000 and in particular from 110 to 4000,
b is an integer from 0 to 1000, preferably from 1 to 500, particularly preferably from 1 to 300 and in particular from 1 to 200,
c is an integer from 0 to 500, preferably from 0 to 200, in particular from 0 to 50,
d is an integer from 0 to 500, preferably from 0 to 200, particularly preferably from 0 to 100 and in particular from 0 to 70,
e, f and g are integers from 0 to 500, preferably from 0 to 300, particularly preferably from 0 to 200, in particular from 0 to 100,
with the proviso that
1. the fragments having the indices b to g can be freely permutated among one another, i.e. can be exchanged with one another in the sequence within the polyether chain, and
2. the fragments having the indices b, c and e can be present in blocks or randomly distributed as desired and invention differ clearly from the silicone polyethers prepared on the basis of chlorosiloxanes or hydrogensiloxanes.

The process of the invention makes it possible to vary the polymer structure of the polyether siloxanes of the invention in a variety of ways as a function of the type of starter and type, amount and order of the monomers which can be used and thus tailor important use properties of the products according to the intended use. The surface-active properties of the products, generally their hydrophilicity or hydrophobicity, can be influenced within wide limits by structure variations. The polymers obtained by the process of the invention are therefore suitable, for example, as polyurethane foam stabilizers, wetting agents, dispersing additives, deaerators or antifoams. Owing to their terminal hydroxyl groups, they are, in contrast to conventional polyether siloxanes, reactive synthetic building blocks for subsequent reactions.

As reactors for the reaction claimed according to the invention, it is in principle possible to use all suitable types of reactor which allow the reaction and any evolution of heat to be controlled. The reaction can be carried out in a manner known to a process engineer either continuously, semicontinuously or batchwise and the way in which the reaction is carried out can be matched flexibly to the available production facilities. Apart from conventional stirred tank reactors, it is also possible to use jet loop reactors with gas phase and internal heat-exchange tubes, as described in WO-01/062826 (US Patent Appl. Pub. 2003-004378). Furthermore, gas-phase-free loop reactors can also be used.

In the introduction of the starting materials, good distribution of the materials participating in the chemical reaction, i.e. the epoxide monomers, starters, DMC catalyst and any suspension medium, has to be ensured.

Further subjects of the invention are described by the claims.

The products according to the invention and the corresponding processes for preparing them are described below by way of example without the invention being restricted to these illustrative embodiments. If ranges, general formulae or classes of compounds are indicated below, these encompass not only the corresponding ranges or groups of compounds which are explicitly mentioned but also all subranges and subgroups of compounds which can be obtained by leaving out individual values (ranges) or compounds.

The invention is further described by the following non-limiting examples which further illustrate the invention, and are not intended, nor should they be interpreted to, limit the scope of the invention.

EXAMPLES

The present invention is described by way of example in the examples below without implying any restriction of the invention, whose scope is defined by the total description and the claims, to the embodiments mentioned in the examples being implied.

Preparation of silicone polyethers according to the process of the invention by direct alkoxylation of organomodified α,ω-dihydroxysiloxanes by means of DMC catalysts. The chain length of the SiOH-functional starters was determined by $^{29}$Si-NMR analyses and is described by the index a in the formula (I). The water content of the α,ω-dihydroxysiloxanes was determined by the Karl-Fischer method. The average molar masses of the alkoxylation products were determined by GPC analysis against polystyrene as standard and in tetrahydrofuran as solvent. The polydimethylsiloxanediols used as starters in the experiments described below are characterized by the following analytical data:

Siloxanediol 1: a=200 Water content=0.02% by weight
Siloxanediol 2: a=50 Water content=0.02% by weight
Siloxanediol 3: a=6.6 Water content=1.1% by weight Example 1

185.0 g of siloxanediol 1 and 0.12 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, one portion of 40.0 g of propylene oxide is added. After 40 minutes have elapsed and the reaction has commenced (drop in internal pressure in the autoclave has occurred), a further 330.0 g of propylene oxide are metered in continuously and with cooling at 130° C. and a maximum internal pressure in the reactor of 0.6 bar (absolute) over a period of 45 minutes. After an after-reaction time of 1 hour at 130° C., the reaction mixture is degassed under reduced pressure to remove any volatile constituents such as residual propylene oxide. The viscous high molecular weight polyether siloxane formed is drained hot (about 100° C.) from the reactor.

The product is a turbid, wax-like solid after cooling to room temperature and has a weight average molar mass $M_w$ of about 44 400 g/mol, a number average molar mass $M_n$ of about 32 000 g/mol and a polydispersity of 1.39.

Example 2

300.0 g of siloxanediol 2 and 0.06 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, one portion of 50.0 g of propylene oxide is added. After 48 minutes have elapsed and the reaction has commenced (drop in internal pressure in the autoclave has occurred), a further 250.0 g of propylene oxide are metered in continuously and with cooling at 130° C. and a maximum internal pressure in the reactor of 0.8 bar (absolute) over a period of 90 minutes. After an after-reaction time of 1 hour at 130° C., the reaction mixture is degassed under reduced pressure to remove any volatile constituents such as residual propylene oxide. The polyether siloxane formed is cooled to about 80° C. and then drained from the reactor.

The product is turbid and has a low viscosity after cooling to room temperature and has a weight average molar mass $M_w$ of about 12 250 g/mol, a number average molar mass $M_n$ of about 9050 g/mol and a polydispersity of 1.36.

Example 3

Example 2 is repeated with the removal of any liquid constituents present by distillation before the first addition of propylene oxide being omitted. The activation time to commencement of the reaction is 30 minutes. The product is turbid and has a low viscosity after cooling to room temperature and has a weight average molar mass $M_w$ of about 11 350 g/mol, a number average molar mass $M_n$ of about 8800 g/mol and a polydispersity of 1.29.

Example 4

300.0 g of siloxanediol 2 and 0.12 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, one portion of 50.0 g of propylene oxide is added. After 35 minutes have elapsed and the reaction has commenced, a further 850.0 g of propylene oxide are metered in continuously and with cooling at 130° C. and a maximum internal pressure in the reactor of 0.6 bar (absolute) over a period of 55 minutes. After an after-reaction time of 1 hour at 130° C., the reaction mixture is degassed under reduced pressure to remove any volatile constituents such as residual propylene oxide. The polyether siloxane formed is cooled to about 100° C. and then drained from the reactor.

The high molecular weight product is turbid, wax-like after cooling to room temperature and has a weight average molar mass $M_w$ of about 23 100 g/mol, a number average molar mass $M_n$ of about 18 900 g/mol and a polydispersity of 1.22.

Example 5

300.0 g of siloxanediol 2 and 0.09 g of zinc hexacyanocobaltate DMC catalyst are placed under nitrogen in a 3 litre autoclave and heated to 130° C. while stirring. The reactor is evacuated to an internal pressure of 30 mbar in order to remove any volatile constituents present by distillation. To activate the DMC catalyst, one portion of 40.0 g of propylene oxide is added. After 40 minutes have elapsed and the reaction has commenced, firstly a further 100.0 g of propylene oxide, then 150.0 g of 1,2-butylene oxide, 150.0 g of ethylene oxide and another 150.0 g of propylene oxide are metered in continuously and with cooling at 130° C. and a maximum internal pressure in the reactor of 1.6 bar (absolute) over a period of 55 minutes. After each alkylene oxide block, the reaction mixture is given an after-reaction time of 30 minutes. After the last addition of propylene oxide, a subsequent after-reaction of one hour at 130° C. is carried out, and the reaction mixture is then degassed under reduced pressure to remove any volatile constituents such as residual alkylene oxide. The polyether siloxane formed is cooled to about 100° C. and then drained from the reactor.

The product is turbid after cooling to room temperature and has a weight average molar mass $M_w$ of about 25 500 g/mol, a number average molar mass $M_n$ of about 13 000 g/mol and a polydispersity of 1.97.

Example 6

80.0 g of siloxanediol 3 and 0.3 g of zinc hexacyanocobaltate DMC catalyst are placed under nitrogen in a 3 litre autoclave and heated to 130° C. while stirring. The reactor is evacuated to an internal pressure of 30 mbar in order effect partial removal of volatile constituents (e.g. water) by distillation. To activate the DMC catalyst, one portion of 90.0 g of propylene oxide is added. After 75 minutes have elapsed and the reaction has commenced, a further 1110.0 g of propylene oxide and, via a separate second feed line, 210.0 g of siloxanediol 3 were simultaneously metered in continuously and with cooling at 130° C. and a maximum internal pressure in the reactor of 0.9 bar (absolute) over a period of 60 minutes. After an after-reaction time of 90 minutes at 130° C., the mixture is degassed under reduced pressure to remove any volatile constituents such as residual propylene oxide. The polyether siloxane formed is cooled to about 80° C. and then drained from the reactor.

The low-viscosity product is turbid at room temperature and has a weight average molar mass $M_w$ of about 2570 g/mol, a number average molar mass $M_n$ of about 2000 g/mol and a polydispersity of 1.29.

Example 7

80.0 g of siloxanediol 3 and 0.3 g of zinc hexacyanocobaltate DMC catalyst are placed under nitrogen in a 3 litre autoclave and heated to 130° C. while stirring. The reactor is evacuated to an internal pressure of 30 mbar in order to effect partial removal of volatile constituents (e.g. water) by distillation. To activate the DMC catalyst, one portion of 80.0 g of 1,2-butylene oxide is added. After 40 minutes have elapsed and the reaction has commenced, a further 218.0 g of 1,2-butylene oxide are added. After an after-reaction of 45 minutes, 182.0 g of ethylene oxide are metered in continuously at 130° C. with cooling at a maximum internal pressure in the reactor of 0.6 bar (absolute) over a period of 20 minutes. After an after-reaction time of 30 minutes at 130° C., the reaction mixture is degassed under reduced pressure to remove any volatile constituents such as residual alkylene oxide. The polyether siloxane formed is cooled to about 80° C. and then drained from the reactor.

The low-viscosity product is turbid at room temperature and has a weight average molar mass $M_w$ of about 4300 g/mol, a number average molar mass $M_n$ of about 2460 g/mol and a polydispersity of 1.75.

Example 8

80.0 g of siloxanediol 3 and 0.3 g of zinc hexacyanocobaltate DMC catalyst are placed under nitrogen in a 3 litre autoclave and heated to 130° C. while stirring. The reactor is evacuated to an internal pressure of 30 mbar in order to effect partial removal of volatile constituents (e.g. water) by distillation. To activate the DMC catalyst, one portion of 100.0 g of 1,2-butylene oxide is added. After 70 minutes have elapsed and the reaction has commenced, a further 98.0 g of 1,2-butylene oxide are added. After an after-reaction of 45 minutes, firstly 95.0 g of ε-caprolactone then 240.0 g of propylene oxide are metered in continuously at 130° C. with cooling at a maximum internal pressure in the reactor of 0.4 bar (absolute). After an after-reaction time of 60 minutes at 130° C., the reaction mixture is degassed under reduced pressure to remove any volatile constituents such as residual alkylene oxide. The ester-modified polyether siloxane formed is cooled to about 80° C. and then drained from the reactor.

The low-viscosity product is turbid at room temperature and has a weight average molar mass $M_w$ of about 5680 g/mol, a number average molar mass $M_n$ of about 4350 g/mol and a polydispersity of 1.31.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A process for the alkoxylation of organosiloxanes bearing SiOH groups by means of one or more epoxide monomers in order to produce the silicone polyethers of the formula (VII),

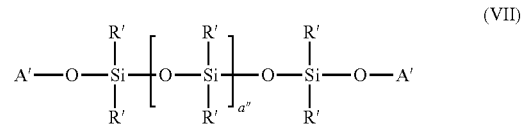

(VII)

where the radicals R are identical or different linear or branched, saturated, monounsaturated or polyunsaturated alkyl radicals having from 1 to 20 carbon atoms, and a is an integer from 0 to 5000, and A is a polyether fragment represented by the formula (VIII)

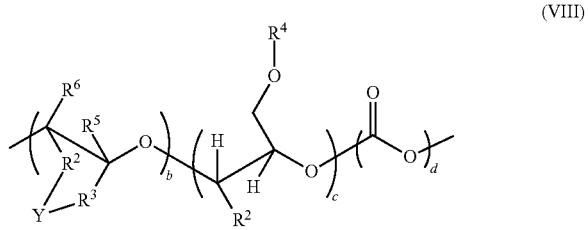

(VIII)

-continued

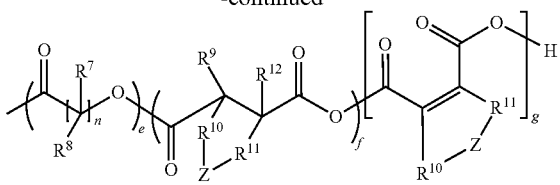

in which $R^2$ or $R^3$ and $R^5$ or $R^6$ are identical or different and are each, independently of one another, H or a saturated or monounsaturated or polyunsaturated, monovalent or polyvalent hydrocarbon radical which may be further substituted, where the radicals $R^2$ or $R^3$ are each a monovalent hydrocarbon radical and the hydrocarbon radical can be cycloaliphatically bridged via the fragment Y; Y can be absent or be a methylene bridge having 1 or 2 methylene units, $R^4$ is an ether or ester function on a linear or branched alkyl radical having from 1 to 24 carbon atoms or an aromatic or cycloaliphatic radical, n is an integer from 2 to 8 and $R^7, R^8, R^9, R^{10}, R^{11}$ and $R^{12}$ are each, independently of one another, hydrogen or an alkyl, alkoxy, aryl or aralkyl group, a is an integer from 0 to 5000, b is an integer from 0 to 1000, c is an integer from 0 to 500, d is an integer from 0 to 500, e, f and g are integers from 0 to 500, with the proviso that a) the fragments having the indices b to g can be freely permutated among one another, i.e. can be exchanged with one another in the sequence within the polyether chain, and b) the fragments having the indices b, c and e can be present in blocks or randomly distributed as desired and c) the sum b+c+d+e+f+g>zero and the sum of d+e+f+g>zero and d) the indices c to g are different from zero when the index b is from 1 to 200 and at the same time the fragment having the index b is EO (ethylenoxy group) or PO (propylenoxy group) or e) when the sum of the indices c to g is zero and the index b is from 1 to 200 and the fragments are EO or PO units, these are not present in a random sequence, wherein:

the alkoxylation takes place in the presence of double metal cyanide catalysts; and lactones, saturated, unsaturated or aromatic cyclic dicarboxylic anhydrides or carbon dioxide are used either alone or in any mixtures with one another as monomers; and the epoxide monomers of formula (II) or (III)

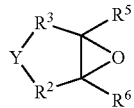

(II)

where $R^2$ or $R^3$ and $R^5$ or $R^6$ are identical or different and are each, independently of one another, H or a saturated or monounsaturated or polyunsaturated, monovalent or polyvalent hydrocarbon radical which may be further substituted, where the radicals $R^2$ or $R^3$ are each a monovalent hydrocarbon radical and the hydrocarbon radical can be cycloaliphatically bridged via the fragment Y; Y can be absent or be a methylene bridge having 1 or 2 methylene units, the hydrocarbon radicals $R^2$ and $R^3$ in the formula (II) can in turn be further substituted and bear functional groups such as halogens, hydroxyl groups or glycidyloxypropyl groups; or

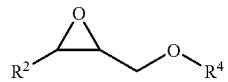

(III)

where at least one glycidyloxypropyl group is bound via an ether or ester function $R^4$ to a linear or branched alkyl radical having from 1 to 24 carbon atoms, an aromatic or cycloaliphatic radical, added in blocks or randomly as desired onto a chain starter of the formula (I)

are incorporated terminally, in isolated positions, cumulated in blocks or randomly distributed into the alkylene oxide chain of the silicone polyether, or added in blocks or randomly onto one or more chain starters of the formula (I) having at least one reactive SiOH group.

2. Process according to claim 1, characterized in that the reaction is carried out in an inert solvent or a mixture of a plurality of inert solvents.

3. Process according to claim 2, characterized in that the starter of the formula (I) and/or a previously prepared silicone polyether of the formula (VII) is used as solvent or suspension medium for the DMC catalyst.

4. Process according to claim 3, characterized in that the molar ratio of epoxide to the reactive groups of the starter of the formula (I), in particular the OH groups in the starter mixture, is 0.1-100:1 in the start phase.

5. Process according to claim 4, characterized in that the reaction is carried out batchwise or continuously.

6. Process according to claim 5, characterized in that the DMC catalyst concentration is from >0 to 5000 wppm based on the total mass of the alkoxylation products formed.

7. Process according to claim 6, characterized in that the catalyst is introduced as solid or in the form of a catalyst suspension.

8. Polyether siloxanes of the formula (VII) prepared by a process of claim 1 wherein, compounds of the formula

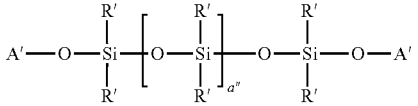

(IX)

where

R' is a methyl group;

A' is $-(CH_2-CH_2-O)_h-(CH_2-CH(CH_3)O)_i-(CH_2-CH_2-O)_j-H$;

h, i and j is, independently of one another, from 0 to 200;

the polyether units h, i and j are randomly distributed; and a" is an integer from 0 to 4999;

are excluded.

9. Polyether siloxanes of claim 8 wherein, compounds of the formula (IX), where:
the sum h+i+j>0; and
a" is an integer from 1 to 2000;
are excluded.

10. A process according to claim 1, characterized in that the epoxide monomers of formula (II) are selected from the group comprising ethylene oxide, propylene oxide, 1,2-or 2,3-butylene oxide, isobutylene oxide, 1,2-dodecene oxide, cyclohexene oxide, epichlorohydrin and 2,3-epoxy-1-propanol.

* * * * *